United States Patent [19]

Moraveck

[11] 4,110,317

[45] Aug. 29, 1978

[54] URETHANE COATING COMPOSITION AND PROCESS

[75] Inventor: James F. Moraveck, Shelton, Conn.

[73] Assignee: Olin Corporation, New Haven, Conn.

[21] Appl. No.: 432,273

[22] Filed: Jan. 10, 1974

Related U.S. Application Data

[63] Continuation-in-part of Ser. No. 235,800, Mar. 17, 1972, abandoned, which is a continuation-in-part of Ser. No. 33,101, Apr. 29, 1970, abandoned, and Ser. No. 685,309, Nov. 24, 1967, abandoned.

[51] Int. Cl.$^2$ ............................................. C08G 18/48
[52] U.S. Cl. .................................... 528/77; 428/425; 528/85
[58] Field of Search ............... 260/77.5 AP, 77.5 AM

[56] References Cited

U.S. PATENT DOCUMENTS

| 2,830,037 | 4/1958 | Carter | 260/77.5 AP |
|---|---|---|---|
| 2,901,467 | 8/1959 | Croco | 260/77.5 AP |
| 3,386,962 | 6/1968 | Damusis | 260/77.5 AP |

FOREIGN PATENT DOCUMENTS 992,735  5/1965  United Kingdom ............. 260/77.5 AP

OTHER PUBLICATIONS

Saunders et al., Polyurethanes, Part II, Interscience, N.Y., 1964, pp. 477–479.

*Primary Examiner*—M. J. Welsh

[57] ABSTRACT

Urethane coatings having improved weather and erosion resistant properties are provided by applying and curing in an atmosphere containing moisture a coating composition comprising
  (1) an isocyanate-terminated prepolymer comprised of the reaction product of
    (a) a polytetramethylene ether glycol having an average molecular weight between about 500 and about 700,
    (b) an oxyalkylated triol having an average molecular weight between about 400 and about 1000 in an amount between 0 and about 20 percent by weight based on the combined weight of the oxyalkylated triol and the polytetramethylene ether glycol, and
    (c) an organic diisocyanate and
  (2) an inert organic solvent.

These coatings are particularly suitable for helicopter blades, radomes, leading edges of aircraft, and the like.

7 Claims, No Drawings

URETHANE COATING COMPOSITION AND PROCESS

This application is a continuation-in-part of abandoned U.S. application Ser. No. 235,800, filed Mar. 17, 1972 which was a continuation-in-part of abandoned applications Ser. No. 33,101, filed Apr. 29, 1970, now abandoned, and Ser. No. 685,309, filed Nov. 24, 1967, now abandoned.

The invention described herein was made in the course of performing work under a contract with the United States Air Force.

This invention relates to selected isocyanate-terminated prepolymers, to urethane coating forming compositions prepared therefrom and to a method for providing weather and erosion resistant urethane coatings.

Extended efforts have recently been made to develop coatings for specialized applications where weather-resistant properties are desired. For example, helicopter blades, leading edges of aircrafts, radomes, etc. are particularly susceptible to erosion due to rain, hail, sand and other weather and atmospheric conditions. To protect a substrate from the eroding effects of various atmospheric conditions, many coating and film compositions containing isocyanate reaction products have been suggested by the prior art. See, for example, U.S. Pat. No. 2,830,037, No. 2,901,467, and No. 3,386,962 and British Pat. No. 992,735. Neoprenes and various other rubber coating compositions have also been used. However, none of these coating compositions have been found to perform satisfactorily under extreme weather conditions and for extended periods of exposure to rain and other eroding atmospheric conditions.

It is a primary object of this invention to provide a novel urethane coating composition which has improved weather and erosion resistant properties. Another object is to provide a moisture-curable isocyanate-terminated prepolymer coating forming composition which is highly resistant to rain erosion. A further object is to provide a flexible urethane coating composition having excellent physical properties. These and other objects of the invention will become apparent to those skilled in the art from the following description.

In accordance with this invention, it has now been found that selected, moisture-curable isocyanate-terminated prepolymers, prepared by reacting (1) an organic diisocyanate with (2) a polytetramethylene ether glycol having an average molecular weight ranging from about 500 to about 700 and (3) an oxyalkylated triol in an amount ranging from 0 to about 20 percent by weight, based on the combined weight of the oxyalkylated triol and the polytetramethylene ether glycol, provide flexible urethane coatings having superior rain erosion-resistant properties. This discovery is particularly surprising since it has been found that various other glycols, such as polypropylene ether glycol, do not provide coatings having the desired combination of flexibility, softness and weather-resistance. Furthermore, the utilization of polytetramethylene ether glycols having the aforementioned molecular weights to provide flexible, elastomeric coatings is particularly surprising and unexpected in view of U.S. Pat. No. 2,830,037 which indicates that polytetramethylene ether glycols having a molecular weight of at least 750 should be employed where elastomeric coatings are desired.

In preparing the isocyanate-terminated prepolymers of the invention, a sufficient proportion of an organic diisocyanate is reacted with the polytetramethylene ether glycol, alone or in combination with the above-indicated proportion of the oxyalkylated triol, to provide an isocyanate (NCO) group to hydroxyl (OH) group ratio ranging from about 1.2:1 to about 1.8:1 and preferably from about 1.3:1 to about 1.7:1. Thus, the NCO:OH ratio is a critical factor in preparing the prepolymer coatings of the invention, for it has been found that if the prepolymer has an NCO:OH ratio exceeding about 1.8, the coating will have poor erosion resistance; whereas weak, tacky gums are obtained where the NCO:OH ratio is below about 1.2. In the most preferred embodiment of the invention an NCO:OH ratio is employed which ranges from about 1.4:1 to about 1.6:1.

As indicated above, the polytetramethylene ether glycol used in preparing the isocyanate-terminated prepolymers of the invention has an average molecular weight between about 500 and about 700. In the preferred embodiment of the invention, however, this molecular weight ranges from about 600 to about 680.

Any organic diisocyanate can be employed which is capable of reacting with the aforesaid polytetramethylene ether glycol to yield an isocyanate-terminated prepolymer. Illustrative organic diisocyanates of this type may be represented by the formula:

$$R(NCO)_2$$

where R is a divalent organic moiety selected from the group consisting of divalent aliphatic moieties having between about 1 and about 8 carbon atoms, divalent alkylene moieties having between 2 and about 8 carbon atoms, divalent aromatic moieties having between 6 and about 12 carbon atoms, and divalent aliphatic-aromatic moieties having between about 7 and about 14 carbon atoms.

Typical examples of suitable organic diisocyanates include aliphatic diisocyanates such as ethylene, trimethylene, tetramethylene, pentamethylene, hexamethylene, propylene-1,2, butylene-1,2, butylene-2,3, butylene-1,3, ethylidene and butylidene diisocyanates; cycloalkylene diisocyanates such as cyclopentylene-1,3, cyclohexylene-1,4 and cyclohexylene-1,2 diisocyanates; aromatic diisocyanates such as m-phenylene, p-phenylene, 4,4'-diphenyl and 1,5-naphthalene diisocyanates; aliphatic-aromatic diisocyanates such as 4,4'-diphenylene methane, 2,4-toluene, 2,6-toluene, 4,4'-tolidine and 1,4-xylene diisocyanates; nuclear substituted aromatic diisocyanates such as dianisidine diisocyanate, 4,4'-diphenyl ether diisocyanates and chlorodiphenylene diisocyanates, mixtures thereof, isomers thereof, and the like. The preferred organic diisocyanate, however is toluene diisocyanates.

The oxyalkylated triol utilized to prepare the prepolymers of the invention is employed in a proportion ranging from 0 to about 20 percent, and preferably from 0 to about 15 percent by weight based on the combined weight of the polytetramethylene ether glycol and the oxyalkylated triol. In a more preferred embodiment of the invention, a proportion of oxypropylated triol ranging from about 8 to about 12 percent is employed. Prepared by reacting a 1,2-epoxide with a triol, the oxyalkylated triol employed according to the invention preferably has an average molecular weight ranging from about 400 to about 1000. Suitable 1,2-epoxides employed in preparing the oxyalkylated triol include ethylene oxide, propylene oxide, the butylene oxides, styrene oxide, glycidol, N-hexyl oxide, cyclobutylene oxide, cyclohexylene oxide, the epihalohydrins such as 4,4,4-trichloro-1,2-epoxybutane, mixtures thereof and the like. However, preferably an alkylene oxide having 2 to 4 carbon atoms is employed, such as ethylene oxide, propylene oxide, butylene oxide, or mixtures thereof. Any triol may be used in preparing the oxyalkylated triol although the aliphatic triols are preferred, such as glycerine, trimethylolpropane, hexanetriol, mixtures thereof, and the like. The oxyalkylated triol is provided according to known techniques by reacting the appropriate 1,2-epoxide with the triol in the presence of a basic catalyst, e.g., potassium hydroxide. The oxyalkylation is carried out at a temperature between about 30° and about 200° C. until an oxyalkylated triol having the desired molecular weight is obtained.

Since the isocyanate-terminated prepolymers of the invention are moisture-curable, the preparation thereof is carried out with the exclusion of moisture to preclude premature curing. This can be achieved, for example, by using a blanket or atmosphere of nitrogen.

Although the reaction can be carried out in the absence of a solvent, the use of an inert solvent medium is preferred. Any such solvent may be employed. Suitable solvents include ethyl acetate, benzene, ethylene glycol monoethyl ether acetate, xylene, toluene, cellosolve acetate, methylisobutyl ketone, cyclohexenone, and other alkyl ketones and acetates or mixtures thereof. Generally, it is preferred to use an inert solvent which forms a low-boiling azeotrope with water, such as ethyl acetate or benzene, since such an azeotrope can easily be removed by distillation to effect drying of the reaction mass.

Various additives may be employed in the preparation of the urethane coating composition of this invention in order to improve its viscosity, stability, color, etc. For example, an anti-oxidant such as 2,6-di-tert-butyl-4-methyl phenol may be admixed with the polytetramethylene ether glycol solution, and viscosity control compounds or flow control compounds, such as cellulose acetate butyrate in a solution of ethylene glycol monoethyl ether acetate, may be advantageously employed. If desired, conventional pigments such as carbon black, titanium dioxide, etc. may be added to the solution to obtain a coating of a desired color, since the coatings of this invention are normally clear. Catalysts can also be employed in the preparation of the urethane coating composition although they are not necessary.

In one embodiment of this invention, the polytetramethylene ether glycol and the oxyalkylated triol are admixed with one of the aforementioned solvents and any desired additive. The resulting mixture is then heated to a temperature sufficient to form an azeotrope of the solvent and water that may be present and to effect distillation of this azeotrope. The temperature at which this is accomplished varies with the type of solvent and proportion of water present. For example, when ethyl acetate is employed as the azeotroping agent in a solvent mixture of xylene and ethylene glycol monoethyl ether acetate, the solution is generally refluxed at about 70° C. until all of the water is removed as an azeotrope of water and ethyl acetate. If desired, the mixture can be dehydrated in a falling film evaporator, and no solvent will be necessary in carrying out the process of this invention. After water has been removed, the reaction solution is cooled to a temperature in the range between about 10° and about 40° C. prior to adding the organic diisocyanate in order to minimize the formation of gels during the addition step. It is also desirable to add the organic diisocyanate as rapidly as possible with agitation.

Addition of the organic diisocyanate generally causes an increase in temperatures due to the exothermic nature of the reaction. The reaction is preferably carried out under atmospheric pressure, but any pressure may be employed that will not cause undesirable side reactions. Completion of the reaction is indicated by measuring the free isocyanate content of the solution employing conventional analytical techniques.

The resulting isocyanate-terminated prepolymer is stored under a nitrogen blanket at a temperature below about 30° C. until ready for use as a coating. It may be stored for extended periods without the occurrence of any undesirable side reaction such as cross-linking.

The urethane coating composition of this invention comprises the previously described isocyanate-terminated prepolymer and an inert organic solvent. Thus, where the prepolymer is prepared in the presence of an inert organic solvent, a urethane coating composition suitable for application is obtained directly. If a solvent-free system is employed in the preparation of the prepolymer, an inert organic solvent is added thereto to provide a coating composition suitable for application. Of course, additional inert organic solvents may be added to the coating composition wherein the isocyanate-terminated prepolymer is formed in situ.

Any of the inert organic solvents previously discussed as suitable solvents in the preparation of the isocyanate-terminated prepolymer can be suitably employed herein. While the amount of solvent employed is not critical, sufficient solvent should be added to provide a composition which can be easily and economically applied. Thus, generally the urethane coating composition of this invention comprises between about 40 and 80 percent solids, the solids including the isocyanate-terminated prepolymer and any additional solid additives.

The urethane coating composition of this invention is of the "air dry-moisture set" type in that it contains free —NCO groups which are cured under atmospheric conditions by reaction of the free —NCO groups with the moisture in the air to effect solidification thereof. The coating composition is applied by conventional techniques, such as brushing, rolling, spraying, dipping, and the like. The liquid coated surface is then cured in an atmosphere which contains at least about 15 percent relative humidity and preferably between about 35 and about 65 percent relative humidity. The temperature of the atmosphere during curing may range from room temperature up to about 60° C.

While the coatings of this invention cure satisfactorily in short periods of time, catalysts such as dibutyl tin dilaurate, a 2:1 mixture of dipropylene glycol:1,4-diazobicyclooctane (DABCO-33LV), trimethylpiperazine, stannous octoate, triethylamine, and triethylene diamine, may be added in catalytic amounts, prior to application of the coating to accelerate the curing process.

The use of an "air dry-moisture set" cure is another critical element of this invention, since curing the above-described urethane coating composition by the addition of polyols, or by heating at high temperatures, provides coatings lacking in the strength and weather-resistance exhibited by the air dry-moisture set coatings.

The urethane coating composition of this invention can be suitably applied to a variety of surfaces. For example, metals including stainless steel, aluminum, various alloys, etc.; resins, e.g., epoxies and phenolics; fiber-glass/resin laminates; glass; plastics; wood, etc., are advantageously protected by the aforementioned urethane coatings.

While good adhesion of the coating to a substrate can usually be achieved without employing a primer, primer compositions may be employed. Exemplificative primers include polyvinylbutyral-acid catalyzed resins, epoxy based-amine cured resins and the like.

As mentioned previously, the urethane coatings of this invention are surprisingly soft and flexible. Thus, the cured coatings are characterized by an ASTM (American Society for Testing Materials) D-2134 62T Sward Hardness of less than 25. The Sward Hardness test is a non-destructive test whereby reproducible hardness values are obtained as a percentage of the hardness of plate glass, determined by the number of oscillations of the standard rocker hardness tester. In addition, these coatings pass an ASTM D-522-60, one eighth inch diameter Conical Mandrel Elongation Test at −40° F., indicating the superior flexibility of these soft coatings.

The coatings of this invention are also characterized by surprising weather and erosion resistant properties. Their resistance to erosion by sand, rain, hail and the like makes them particularly attractive as coatings for leading surfaces of aircraft, helicopter blades, radomes and other such applications. The superior weather and erosion resistant properties of these coatings have been determined under dynamic conditions and thus meet the stringent requirements of such applications. Further indication of the excellence of these coatings is set forth in the examples below.

In the examples and comparisons that follow, the rain erosion resistance tests which are reported were made under dynamic conditions in accordance with Military Specification MIL-C-7439B, Section 4.3.2.3., Feb. 4, 1955 Revision. Suitable equipment for conducting this test was constructed. This includes a horizontal, no-pitch, rotating blade, 6 feet long, having cut-outs at each end, which cut-outs enable 5-inch air foil-shaped test specimens to be mounted thereon. The rotating blade is powered by a direct drive, variable speed, 40 HP DC motor which enables achieving linear velocities, at the tip of the blade, of 450 to 500 miles per hour, a velocity of 500 miles per hour being used for carrying out the reported rain erosion resistance tests.

A simulated rain field is produced by a tubular ring fitted with 32 evenly spaced hypodermic needles, each capable of producing spherical water drops approximately 2-2.5 millimeters. The tubular ring, which is divided into four sections or quadrants, is mounted 18 inches above the blade. The 8 needles in each quadrant are positioned so that the water drops impinge across the length of the specimen as it rotates through each quadrant. In this way the drops are distributed evenly across the specimen face and not concentrated in any specific area. The flow rate through each needle is regulated by a hypodermic stopcock attached to the tubular ring.

The area covered by the 5-inch specimen in one complete revolution is used in calculating the rainfall rate per unit area. Based on this, a 2-inch per hour rainfall rate is calculated to be achieved using 32 hypodermic needles, 18 gauge, each delivering 15 milliliters of water per minute.

The test specimens are continuously monitored from the time the test is commenced until failure of the coating is first observed. The monitoring is made through a periscope equipped with binoculars.

The resistance of a coating to rain is measured in time (minutes) using a stopwatch. This is the time elapsed from the commencement of the test until failure occurs as determined by the first appearance of a bare spot in the substrate. The type of failure, adhesion failure or erosion failure, is also noted. Adhesion failure is observed when a spot in the substrate first becomes bare or exposed as a result of the coating peeling or coming off. Erosion failure is observed when a spot in the substrate first becomes exposed as a result of the coating becoming gradually thinned out, eroded, or is broken into by the falling water drops. In general, erosion failure is preferred over adhesion failure because in the former, the surface adjacent the eroded spot remains intact as though no rain had impinged on the other areas of the specimen; whereas adhesion failure is usually precipitous, large sections of the coating getting rapidly peeled off once this type of failure occurs.

Sand erosion resistance under dynamic conditions was tested in the same manner and employing basically the same equipment as described above for the rain erosion resistance test. The sand was distributed from sand hoppers located on the roof of the test facility and dispersed over the width of the tested specimen path by inclined deflector plates positioned one-half inch above the propeller.

The following examples will serve to illustrate the practice of this invention. All parts and percentages given are by weight unless otherwise specified.

EXAMPLE 1

The amount of 39.48 parts (0.13 hydroxy equivalent) of polytetramethylene ether glycol having an average molecular weight of about 650 was mixed under a nitrogen blanket in a 5 liter reaction flask with 27.83 parts of xylene, 9.27 parts of ethylene glycol monoethyl ether acetate, 4.60 parts of methyl isobutyl ketone, 2.50 parts of ethyl acetate and 0.8 part of 2,6-di-tert-butyl-4-methyl phenol. The mixture was then dried by azeotroping at about 70° C. for approximately two hours. After cooling to room temperature, 15.51 parts (0.18 isocyanate equivalent) of toluene diisocyanate, comprising 80 percent of the 2,4-isomer and 20 percent of the 2,6-isomer, were added with stirring. An exothermic reaction raised the temperature of the reaction mixture about 30° C. After approximately eight hours, the reaction mixture had cooled to ambient temperature, and the NCO:OH ratio in the mixture was approximately 1.4:1.

An airfoil shaped test specimen, fabricated from 2024-T3 aluminum and conforming in size and shape to Military Specification MIL-C7439B, was pretreated by immersion in aqueous 4 percent sodium hydroxide at 60° C. for 2 minutes followed by dipping into 50 percent aqueous nitric acid for 15 seconds and finally washing several times with distilled water and drying. The urethane coating composition described above was sprayed onto this airfoil shaped test specimen to a dry film thickness of 16–18 mils and air cured at 75° F. and 50 percent relative humidity for 14 days. The physical properties of the cured coating are set forth in Table 1 below.

EXAMPLE 1a

An airfoil test specimen, fabricated from a polyester/fiberglass laminate conforming to Military Specification MIL-P-8013, was primed with a polyvinylbutyral acid-catalyzed resin conforming to Military Specification MIL-P-15328B and then coated with the urethane coating composition of Example 1 to a dry film thickness of 17-19 mils. After curing at 75° F. and 50 percent relative humidity for 14 days the rain erosion resistance of the coating, under the conditions set forth in Table 1 below, was determined to be 11.4 minutes.

EXAMPLE 2

Following the procedure of Example 1, a urethane coating composition was prepared employing the following ingredients in the indicated proportions:

| INGREDIENTS | PARTS BY WEIGHT |
|---|---|
| Polytetramethylene ether glycol (Molecular weight 650) | 1380 parts (4.45 hydroxy equivalents) |
| Xylene | 1500 parts |
| Ethylene glycol monoethyl ether acetate | 500 parts |
| Toluene diisocyanate (80% 2,4/20% 2,6) | 619 parts (7.11 isocyanate equivalents) |

The resulting urethane coating composition, which had an NCO:OH ratio of 1.6:1, was sprayed onto an airfoil shaped test specimen, identical to that described in Example 1, to a dry film thickness of 16 mils and air cured at 75° F. and 50 percent relative humidity for 14 days. The physical properties of the cured coating are set forth below in Table 1

TABLE 1

| Physical Properties of Cured Coatings | | | |
|---|---|---|---|
| EXAMPLE | 1 | 1a | 2 |
| Sward Hardness (ASTM D-2134-62T) | 6 | — | 4 |
| Rain Erosion Resistance (2"/hr. rainfall; ave. failure time-erosion failure-in minutes) | 60 | 11.4 | 20 |
| Sand[1] Erosion Resistance (1600 mil/min; ave. failure time in minutes) | 5.0 | — | 7.5 |
| Sand[2] Abrasion | >250 | — | >250 |
| Flexibility (Conical Mandrel ASTM D-522-60) (⅛" diameter, −40° F.) | Pass | — | Pass |

[1]No. 4 silica sand (100-140 mesh size)
[2]Federal Test method Standard No. 141-A, Method 6191. The data represents the number of liters sand/mil of coating, employing No. 94 Ottawa sand, required to penetrate the coating.

EXAMPLE 3

Following the procedure of Example 1, a urethane coating composition was prepared employing the following ingredients in the indicated proportions:

| INGREDIENTS | PARTS BY WEIGHT |
|---|---|
| Polytetramethylene ether glycol (Molecular weight 650) | 296.5 (0.89 hydroxy equivalent) |
| Cellosolve acetate | 88.9 |
| Xylene | 266.8 |
| Toluene Diisocyanate (80% 2,4/20% 2,6) | 139.2 (1.60 isocyanate equivalents) |

The resulting urethane coating composition, which had an NCO:OH ratio of 1.8:1, was sprayed onto an airfoil shaped test specimen, identical to that described in Example 1, to a dry film thickness of 16 mils. It was then air cured at 75° F. and 50% relative humidity for 14 days. The rain erosion resistance of the coating was tested as described above. The coating failed (adhesion failure) after an average of 8.4 minutes of exposure to a 2-inch-per-hour rainfall.

COMPARISON A

This comparison is provided to illustrate the fact that the NCO:OH ratio in the coating compositions of the invention is critical to obtaining coatings of improved rain erosion resistance.

Under a blanket of nitrogen, 300 parts (0.90 hydroxy equivalent) of polytetramethylene ether glycol having an average molecular weight of 660 were mixed with about 90 parts of cellosolve acetate and about 270 parts of xylene. The mixture was then dried by azeotroping at a temperature of about 80° C. After cooling to room temperature, 156 parts (1.80 isocyanate equivalents) of toluene diisocyanate, consisting of an 80/20 mixture of 2,4/2,6 isomers, were added with stirring. The prepolymer composition thus obtained had an NCO:OH ratio of 2:1.

An aluminum airfoil specimen was primed with polyvinylbutyral resin primer employed in Example 1a. The specimen was then spray-coated with the prepolymer composition to a dry film having a thickness generally comparable to those of the coatings in the preceding examples, after incorporating into the prepolymer composition approximately 0.5 percent of a curing catalyst sold under the trade name "DABCO-33LV". The catalyst used was a mixture of one part 1,4-diazobicyclooctane and two parts dipropylene glycol. The coating was cured for seven days at a temperature of 75° F. and 50 percent relative humidity. It was then subjected to the same rain erosion test applied in the preceding examples. Adhesion failure of the coating was observed after an average of 5 minutes of exposure to a 2-inch-per-hour rainfall. This comparison therefore clearly demonstrates that the NCO:OH ratio in the urethane coatings of the invention is a critical factor if the coatings are to have improved rain erosion resistance. Unlike the coatings of the invention, which are highly rain erosion resistant and in which the upper limit of such ratio is 1.8:1, the coating of Comparison A, with a ratio of 2:1, had a substantially lower level of rain erosion resistance.

EXAMPLE 4

Following the procedure of Example 1, a urethane coating composition was prepared employing the following ingredients in the indicated proportions:

| INGREDIENTS | PARTS BY WEIGHT |
|---|---|
| Polytetramethylene ether glycol (Molecular weight 650) | 35.03 parts (0.113 hydroxy equivalent) |
| Oxypropylated glycerin (Molecular weight 600) | 3.89 (0.019 hydroxy equivalent) |
| Xylene | 27.86 parts |
| Ethylene glycol monoethyl ether acetate | 9.25 parts |
| Methyl isobutyl ketone | 4.59 parts |
| Ethyl acetate | 2.50 parts |
| 2,6-Di-tert-butyl-4-methyl phenyl | 0.80 part |
| Toluene diisocyanate (80% 2,4/20% 2,6) | 16.08 parts (0.185 isocyanate equivalent) |

The resulting urethane coating composition, having an isocyanate content of about 2.30 percent, was sprayed onto an airfoil test specimen identical to that described in Example 1, to a dry film having a thickness generally comparable to those of the coatings in the preceding examples, and then it was air cured at 75° F. and 50 percent relative humidity for 14 days. The physical properties of the cured coating are set forth in Table 2 below.

TABLE 2
Physical Properties of Cured Coating

| EXAMPLE | 3 |
|---|---|
| Sward Hardness (ASTM D-2134-62T) | 9 |
| Rain Erosion Resistance (2"/hr. rainfall; ave. failure time-erosion failure-in minutes) | 23 |
| Sand[1] Erosion Resistance (1600 mil/min; ave. failure time in minutes | 7.0 |
| Sand[2] Abrasion | >250 |
| Flexibility (Conical Mandrel ASTM D-522-60) (⅛" diameter, −40° F.) | Pass |

[1] No. 4 silica sand (100–140 mesh size)
[2] Federal Test Method Standard No. 141-A, Method 6191. The data represents the number of liters sand/mil of coating, employing No. 94 Ottawa sand, required to penetrate the coating.

EXAMPLE 5

Following the procedure of the previous examples, a urethane coating composition having an isocyanate content of 3.92 percent was prepared employing the following ingredients in the following proportions:

| INGREDIENTS | PARTS BY WEIGHT |
|---|---|
| Polytetramethylene ether glycol (Molecular weight 650) | 936 parts (2.87 hydroxy equivalents) |
| Oxypropylated glycerin (Molecular weight 600) | 104 parts (0.51 hydroxy equivalent) |
| Xylene | 375 parts |
| Ethylene glycol monoethyl ether acetate | 125 parts |
| Toluene diisocyanate (80% 2,4/20% 2,6) | 460 parts (5.29 isocyanate equivalents) |

The urethane coating composition, containing 0.2 percent by weight of dibutyltin dilaurate catalyst which had been added just prior to coating, was applied to the blades of an HU-1 helicopter to a dry film thickness of 15–20 mils. The blades were comprised of stainless steel primed with a polyvinylbutyral acid-catalyzed resin conforming to Military Specification MILP-15328B. After allowing the coating to air-dry moisture-cure for seven days, the helicopter was flown for a total of 170.4 hours under these conditions: approximately two hours flying time in heavy rain, 15 hours in light rain or mist, 12 hours in salt air and the remainder under normal conditions. At the end of the test period, no erosion of the coating and only slight wear on the outboard tips of the blades was observed.

COMPARISON B

This comparison is provided to illustrate the surprising nature of the invention in view of a prior art reference which discloses a two-step process for preparing isocyanate-terminated urethane compositions that are especially useful as coatings.

Under a nitrogen blanket, 287.9 parts (0.86 hydroxy equivalent) of polytetramethylene ether glycol having a molecular weight of about 660 were mixed with 89.3 parts of cellosolve acetate and 267.8 parts of xylene. The mixture was then dried by azeotroping at about 80° C. After cooling to room temperature, 149.7 parts (1.72 isocyanate equivalents) of toluene diisocyanate, consisting of an 80/20 mixture of 2,4/2,6 isomers, were added with stirring. Then 71.9 parts (0.37 hydroxy equivalent) of oxypropylated glycerin (molecular weight 600) were mixed in, yielding a prepolymer composition having an approximate NCO:OH ratio of 1.4:1.

After adding approximately 0.5 percent of the curing catalyst used in Comparison A, an aluminum airfoil specimen, primed with the polyvinylbutyral resin primer employed in Example 1a, was spray-coated with this prepolymer composition to a dry film having a thickness generally comparable to those of the coatings of the preceding examples. After curing, the coating was subjected to the same rain erosion test applied in the preceding examples. Failure of the coating (adhesion failure) was observed after an average of 7.2 minutes exposure to a 2-inch-per-hour rainfall. Thus, coating compositions prepared according to the two-step process taught in the reference do not measure up to the improved rain erosion resistance of the coatings of the invention.

COMPARISON C

This comparison is provided to demonstrate the unobvious nature of the invention in view of another prior art reference which employs an aliphatic triol instead of the oxyalkylated triol of the instant invention in making polyurethane coating compositions.

Under a blanket of nitrogen, 191.5 parts (0.57 hydroxy equivalent) of polytetramethylene ether glycol having an average molecular weight of 660 were mixed with 47.9 parts (1.07 hydroxy equivalents) of trimethylol propane, 90 parts of cellosolve acetate, and 270 parts of xylene. The mixture was then dried by azeotroping at about 80° C. After cooling to room temperature, 200.6 parts (2.30 hydroxy equivalents) of toluene diisocyanate (80/20 mixture of 2,4/2,6 isomers) were added with stirring. The resulting prepolymer composition had an approximate NCO:OH ratio of 1.4:1.

An aluminum airfoil specimen, primed with the polyvinylbutyral resin primer employed in Example 1a, was spray-coated with this composition to a dry film having a thickness comparable to those of the coatings in the preceding examples, after incorporating in the composition 0.5 percent by weight of the curing catalyst employed in the preceding comparison. After the coating was cured, it was subjected to the rain erosion test applied in the preceding examples. The coating failed (adhesion failure) after an average of 1.6 minutes of exposure to a 2-inch-per-hour rainfall. Thus, this demonstrates the criticality of using an oxyalkylated triol, according to the invention, in obtaining a highly rain erosion resistant coating.

EXAMPLE 6

Following the procedure of the previous examples, a urethane coating composition was prepared employing the following ingredients in the indicated proportions:

| INGREDIENTS | PARTS BY WEIGHT |
|---|---|
| Polytetramethylene ether glycol (Molecular weight 650) | 450 (1.408 hydroxy equivalents) |
| Oxypropylated glycerin (Molecular weight 600) | 112 (0.568 hydroxy equivalent) |
| Xylene | 492.7 |
| Cellosolve acetate | 164.2 |
| Toluene diisocyanate (80% 2,4/20% 2,6) | 240.6 (2.766 isocyanate equivalent) |

The resulting urethane coating, which had an NCO:OH ratio of 1.4:1, contained an 80:20 weight ratio of the polytetramethylene ether glycol:oxypropylated glycerin. It was sprayed onto an airfoil shaped test specimen, identical to that described in the previous examples, to a dry film thickness of 16 mils. Then it was air cured at 75° F. and 50% relative humidity. The rain erosion resistance of the coating was tested in the manner described above. The coating failed (erosion failure)

after an average of 15.7 minutes of exposure to a 2-inch-per-hour rainfall.

COMPARISON D

This comparison is provided to illustrate the unobviousness of the invention in view of a combination of the two prior art references referred to in Comparisons B and C. As noted in those tests, one reference differs from the instant invention in that it utilizes a two-step process for preparing the urethane coatings; whereas the other reference employs a one-step process, utilizing an aliphatic triol, instead of the oxyalkylated triol of the instant invention, and a minimum proportion of one mole of triol for each mole of polytetramethylene ether glycol. The purpose of this example is to show that if one were to substitute the oxyalkylated triol of one reference for the aliphatic triol of the other reference, the resulting coating composition still would not have the high rain erosion resistance which is characteristic of the coating compositions of the invention.

Under a nitrogen blanket, approximately one mole of polytetramethylene ether glycol (molecular weight 660, 1.80 hydroxy equivalents) was mixed with approximately one mole of oxypropylated glycerin (molecular weight 600, 3.05 hydroxy equivalents), 180 parts of cellosolve acetate, and 540 parts of xylene. The mixture was then dried by azeotroping at a temperature of about 80° C. After cooling to room temperature, 590 parts (6.79 isocyanate equivalents) of the toluene diisocyanate employed in the preceding examples were added with stirring. The prepolymer composition thus obtained had an NCO:OH ratio of 1.4:1.

An aluminum airfoil specimen, primed with the polyvinylbutyral resin primer employed in Example 1a, was spray-coated with this prepolymer composition after incorporating therein 0.5 percent of the curing catalyst used in the preceding comparison. The dry film thickness of the coating was comparable to those of the coatings of the preceding examples. After curing, the coating was subjected to the same rain erosion test applied in the previous examples. The coating failed (adhesion failure) after an average of 2.4 minutes exposure to a 2-inch-per-hour-rainfall.

What is claimed is:

1. A flexible urethane coating composition comprising a solvent and an isocyanate-terminated prepolymer comprising the reaction product of
   (a) a polytetramethylene ether glycol having an average molecular weight between about 500 and about 700,
   (b) an oxyalkylated triol having an average molecular weight between about 400 and about 1000, in an amount between about 8 and about 12 percent by weight based on the combined weight of said oxyalkylated triol and said polytetramethylene ether glycol, and
   (c) an organic diisocyanate in a proportion sufficient to provide between about 1.2 and about 1.8 -NCO groups for each -OH group in said polytetramethylene ether glycol and said oxyalkylated triol.

2. The coating composition of claim 1 wherein said oxyalkylated triol is the product of oxyalkylating a triol with an alkylene oxide selected from the group consisting of ethylene oxide, propylene oxide, butylene oxide, and mixtures thereof.

3. The coating composition of claim 2 wherein said organic diisocyanate is toluene diisocyanate.

4. The coating composition of claim 3 wherein said triol is an aliphatic triol.

5. The coating composition of claim 4 wherein the proportion of said organic diisocyanate is sufficient to provide from about 1.4 to about 1.6—NCO groups per each —OH group in said polytetramethylene ether glycol and said oxyalkylated triol.

6. The coating composition of claim 5 wherein said triol is glycerin.

7. The flexible coating forming composition of claim 6 wherein said oxyalkylated triol is oxypropylated glycerin having an average molecular weight of about 600.

* * * * *